Patented Dec. 12, 1950

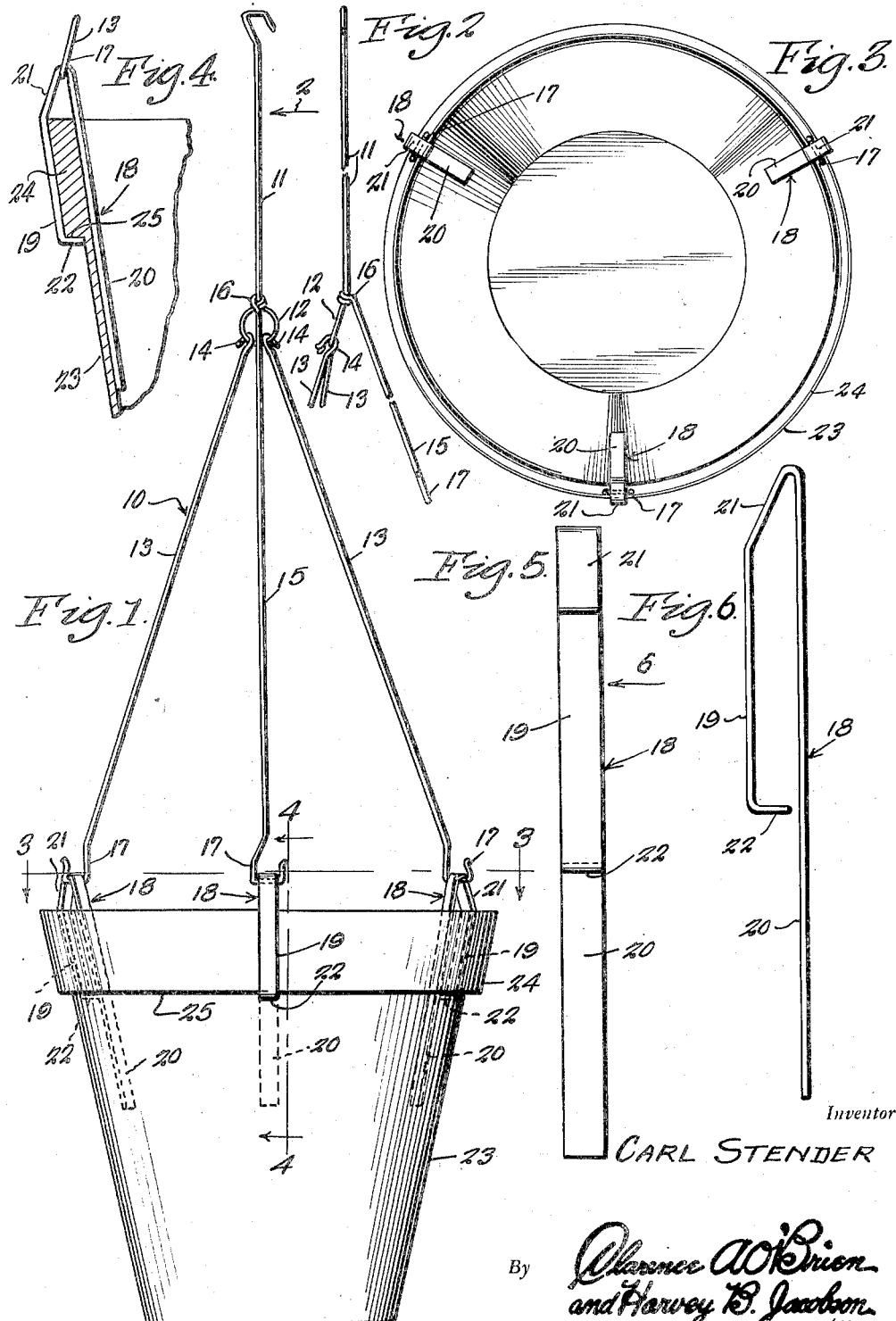

2,533,845

UNITED STATES PATENT OFFICE 2,533,845

FLOWERPOT HANGER

Carl Stender, Richmond, Calif.

Application September 9, 1946, Serial No. 695,724

1 Claim. (Cl. 248—318)

This invention relates to new and useful improvements and structural refinements in flower pot hangers, and the principal object of the invention is to provide a device of the character herein described, such as may be conveniently and effectively employed for the overhead supporting or suspending of flower pots, and the like.

A further object of the invention is to provide a flower pot hanger which is simple in construction and which may be easily and quickly attached to or detached from the pot with which it is used.

Another object of the invention is to provide a hanger which may be effectively employed, without modification, with flower pots of various sizes.

An additional object of the invention is to provide a flower pot hanger which is pleasing in appearance and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention

Figure 2 is a fragmentary elevational view, taken in the direction of the arrow 2 in Figure 1

Figure 3 is a cross-sectional view, taken substantially in the plane of the line 3—3 in Figure 1

Figure 4 is a cross-sectional view, taken substantially in the plane of the line 4—4 in Figure 1

Figure 5 is an elevational view of one of the clips used in the invention, and

Figure 6 is a further elevational view, taken in the direction of the arrow 6 in Figure 5.

Like characters of reference are used to designate like parts in the specification and throughout the several views.

Referring now to the accompanying drawings in detail, the invention consists of a flower pot hanger designated generally by the reference character 10, the same embodying in its construction a hook-shaped wire rod 11, such as may be conveniently suspended by the hook portion thereof from a suitable supporting structure (not shown).

The opposite, that is, the lower end of the rod 11 forms a loop 12, and a pair of suitable wires or cables 13 are separably connected at one end thereof to this eye or loop 12 by means of the hook portions 14 with which they are provided.

A further cable 15 is wound at one end thereof, as at 16, around the rod 11, immediately above the loop 12, as will be clearly understood. The remaining ends of the cables 13 and 15 are formed with further hook portions 17, whereby each of the cables supports a clip 18 hereinafter more fully described.

It will be noted that the cables 13, 15 extend downwardly and outwardly in a mutually divergent relationship and each of the clips designated generally by the reference character 18 consists of a resilient strap doubled upon itself to form a pair of spaced arms 19 and 20.

These arms are of unequal length and are connected together at one end of the clip by an inclined portion 21.

The free end portion of the relatively short arm 19 is angulated toward the long arm 20 as shown at 22, the portions 22, in effect, constituting what may be referred to as seats, designated by the same reference character.

It should, of course, be understood that the several clips 18 are of similar construction, and the description of one will suffice for all.

When the invention is placed in use, the clips 18 are positioned at the upper edge portion of the flower pot 23, the latter being usually provided with an outer marginal flange 24.

The application of the clips 18 to the flower pot is effected by simply spreading the arms 19, 20 thereof, so as to engage the inner and outer surfaces of the pot, more specifically, of the flange 24, as will be clearly apparent from the accompanying drawings.

The seats 22 of the short arm 19 will engage the lower edge 25 of the flange 24, thereby preventing undesired separation of the clips from the flower pot. The supporting cables 13, 15 and the hook member or rod 11 may then be connected to the clips 18 in the manner already described, whereby the pot 23 will be firmly suspended from the overhead supporting structure (not shown).

The pot 23, together with the clips 18, may be readily detached from the cables 13, 15 by simply disengaging the hook portions 17 from the clips, or alternatively, by disengaging the seats 22 from the edge 25 of the flange 24, thus facilitating the withdrawal of the clips 18 from the flower pot.

It should be also added that the inclined disposition of the portion 21 of the clips 18 will tend to place the supporting strain on the long arms 20 of the clips, rather than upon the short arms 19.

It is believed that the advantages and use of the invention will be clearly understood from the foregoing disclosure, and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In association with a flower pot provided at the upper edge thereof with an outer marginal flange, a hanger comprising in combination, a member attached to supporting structure and having a loop at its lower end, a plurality of wires connected at one end to said loop and member and extending downwardly and outwardly therefrom, one of said wires being secured to said member above said loop, others of said wires being secured to said loop, a hook formed at the lower end of each of said wires, and a clip removably suspended from each of said hooks, each of said clips comprising a resilient strap doubled upon itself to form a pair of flat spaced arms of unequal length, said arms engaging the lateral wall of said pot, and the free end portion of the relatively short arm being angulated toward the relatively long arm and forming a flat seat for the lower edge of said flange, and the relatively long arm having lateral edges to grip the curved inner surface of the flower pot and to prevent inadvertent sliding of the clip circumferentially of the flange.

CARL STENDER.

REFERENCES CITED

The following references are of record in the file of this patent:

UNITED STATES PATENTS

| Number | Name | Date |
| --- | --- | --- |
| 778,786 | Kramer | Dec. 27, 1904 |
| 792,905 | Kirchner | June 20, 1905 |
| 1,334,199 | Weiseman | Mar. 16, 1920 |